United States Patent [19]

Storz

[11] Patent Number: 4,564,093
[45] Date of Patent: Jan. 14, 1986

[54] FLUID FRICTION CLUTCH

[75] Inventor: Werner Storz, Benningen, Fed. Rep. of Germany

[73] Assignee: Süddeutsche Kühlerfabrik Julius Fr. Behr GmbH & Co KG, Stuttgart, Fed. Rep. of Germany

[21] Appl. No.: 510,197

[22] Filed: Jul. 1, 1983

[30] Foreign Application Priority Data

Jul. 16, 1982 [DE] Fed. Rep. of Germany ....... 3226634

[51] Int. Cl.$^4$ ............................................. F16D 35/00
[52] U.S. Cl. .................................. 192/58 B; 192/82 T
[58] Field of Search ........................... 192/58 B, 82 T

[56] References Cited

U.S. PATENT DOCUMENTS

| 3,268,041 | 8/1966 | Roper | 192/58 B |
|---|---|---|---|
| 3,983,980 | 10/1976 | Weintz | 192/58 B |
| 4,051,936 | 10/1977 | Crisenbery et al. | 192/58 B |
| 4,086,988 | 5/1978 | Spence | 192/58 B |
| 4,086,989 | 5/1978 | Spence | 192/58 B |
| 4,278,158 | 7/1981 | Martin | 192/58 B |

FOREIGN PATENT DOCUMENTS

| 14072 | 8/1980 | European Pat. Off. . |
| 1441192 | 7/1965 | France . |
| 2370895 | 6/1978 | France . |
| 2087047 | 5/1982 | United Kingdom . |

Primary Examiner—Ronald C. Capossela
Attorney, Agent, or Firm—Barnes & Thornburg

[57] ABSTRACT

The invention relates to a damming arrangement for controlling the return flow of clutch fluid in a fluid friction clutch of the type having a rotatable driving disk disposed to rotate in a work space of a relatively rotatable housing. The work space is separated by an intermediate disk fixed to the housing and a pair of clutch fluid return bores are provided at the periphery of the intermediate disk diametrically opposite one another. To optimize the guidance of the return flow of clutch fluid from the working space to the storage space, damming bodies are disposed adjacent the return bores, which damming bodies include a first guide surface portion extending radially inwardly of the return bores in a diagonal direction corresponding to the rotational direction of the driving disk and a second guide surface portion radially outwardly of the return bore extending diagonally outwardly and opposite of the rotational direction of the driving disk. A connecting guide surface section of the damming body is disposed adjacent the return bore and concentric thereto with a half circular shape open in a direction facing the rotational direction of the driving disk. The damming bodies are supported at the intermediate wall of the clutch housing and protrude inwardly into an outwardly open groove on the driving disk.

14 Claims, 3 Drawing Figures

FLUID FRICTION CLUTCH

BACKGROUND AND SUMMARY OF THE INVENTION

The invention relates to a fluid friction clutch which includes a working space and a storage space separated by an intermediate wall in a housing for clutch fluid. A rotating clutch disk is disposed in the working space and clutch fluid is selectively guided from the storage space into the working space to drivingly connect the clutch disk and housing. The intermediate wall is provided with clutch fluid return bores in the region adjacent the outer circumference of the clutch disk. Damming bodies are provided in the rotational direction behind these bores for return guidance of the clutch fluid into the storage space.

Fluid friction clutches of this general type are known (DE-OS No. 27 50 520). The damming bodies are there formed as flaps which are movable in the rotational direction of the clutch disc by means of the pressure of the fluid behind the return bores. It is a disadvantage with this arrangement that such fluid friction clutches are very difficult to influence in their control characteristics. Thus, when this type of clutch is arranged for the driving of an axial fan which is arranged for the cooler or radiator of a motor vehicle, the fan is accelerated very rapidly to the full driving rotational speed when the cooling air or cooling water temperature achieves a certain value, and this fan speed is maintained for a certain time, also when the temperature of the cooling medium in the meantime has returned to a lower level. This is true also for other known constructions (Visco-Kupplung SAAB SCANIA, T 20 MUL/EDUL), wherein a so-called "swimming" damming body is provided in a ring groove at the circumference of the driven clutch disk, which body is slidable in the circumferential direction between stop pins or protrusions. The unnecessary continued running of the fan with lowered temperatures leads to an undesired reduction in the overall efficiency level.

The invention is based upon the problem of providing a fluid friction clutch of the above-mentioned kind, but with control characteristics whereby the fan rotational speed increases as constantly as possible with increasing temperatures of the cooling medium and with decreasing temperatures of the cooling medium decreases along a similar characteristic velocity curve.

The solution of this problem according to the invention includes the provision of at least two return bores displaced from one another in the circumferential direction of the intermediate wall, and the provision of damming bodies behind the return bores in the rotational direction of the clutch disk, which damming bodies are provided with a guiding surface for the clutch fluid, wherein said guiding surface extends diagonally toward the inside in the clutch disk rotational direction radially inside of the return bores and extends oppositely to the rotational direction of the clutch disk in the region radially outside of the return bores with an outwardly extending approximately tangentially disposed protrusion. Through the arrangement of the two return bores with the associated damming bodies, the return flow of the clutch fluid in comparison to the through flow is brought into such a circulation that with increasing temperatures of the cooling medium an approximately constant increase in the rotational speed of the fan is achieved. Further, with the corresponding increased sensitivity because of the additional return bore and the damming body configuration, the fan speed is reduced to the empty clutch rotational speed with a very flat hysteresis characteristic during conditions of decreasing temperature of the cooling medium. The new configuration of the damming bodies according to the invention assures that the fan only then runs with the driving disk when a cooling load is present. This results in an improved efficiency level and also to a certain corresponding reduction in the fuel usage for the combustion motor/cooler combination.

It is advantageous according to especially preferred embodiments if two diametrically oppositely disposed return bores are provided in the intermediate wall and the guide surfaces at the damming bodies are respectively configured as flat surfaces which extend along lines connecting two points at different radii, wherein the point at the smaller radius is displaced in the rotational direction of the clutch disk with respect to the other point. It is also advantageous if the line connecting these points is inclined to a tangent extending adjacent the return bore at an angle of at least 35° and at most 55°, advantageously approximately 40°. It has been shown that with such an inclination exceptional results are achieved.

It is further advantageous according to preferred embodiments if the guiding surface extends behind the return bore in the rotational direction of the clutch disk and includes a rounded opening in the inner surface of the protrusion, which opening is provided with a half circular shaped contour extending somewhat concentric to the return bore.

Further objects, features, and advantages of the present invention will become more obvious from the following description when taken in connection with the accompanying drawings which show, for purposes of illustration only, a single embodiment in accordance with the present invention.

DETAILED DESCRIPTION OF THE DRAWINGS

Figure 1:
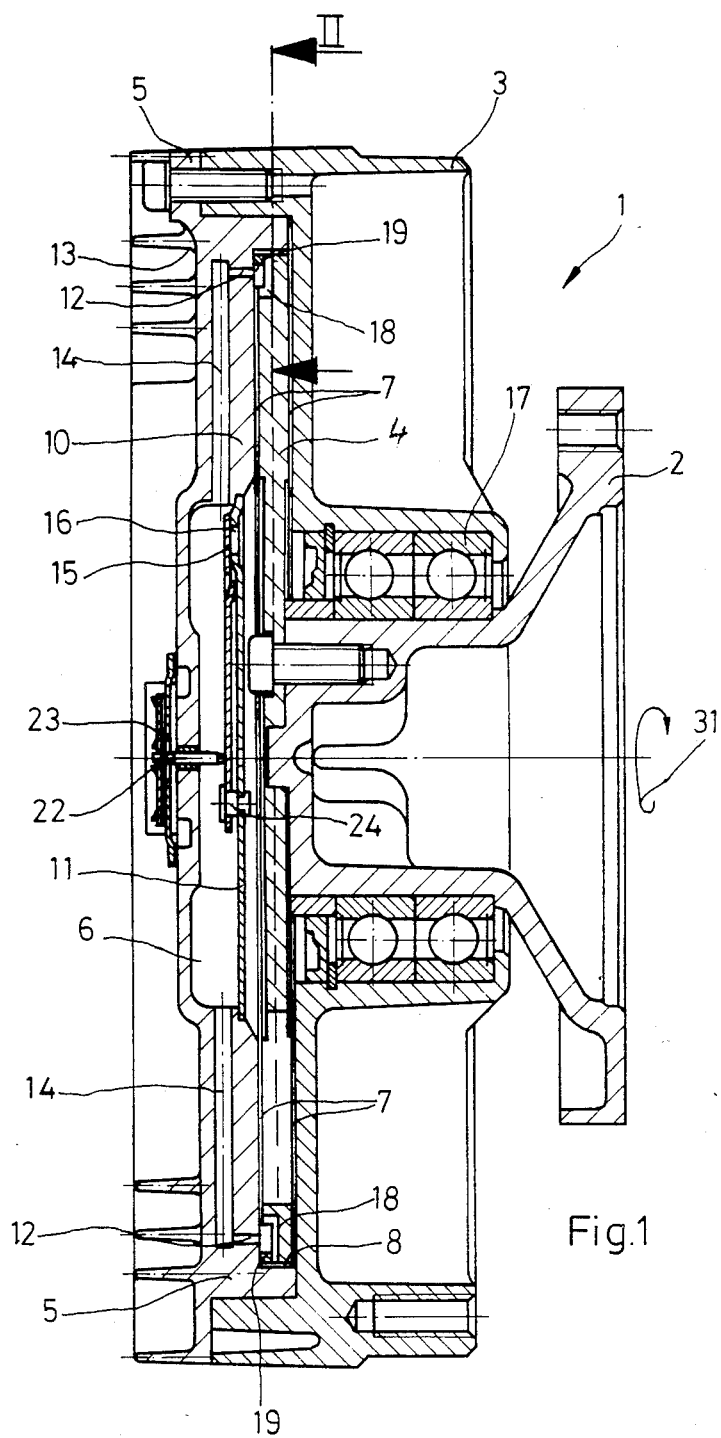
FIG. 1 is a schematic longitudinal sectional view through a new fluid friction clutch constructed in accordance with a preferred embodiment of the invention.

Fluid friction clutch 1 is shown in longitudinal section in FIG. 1. The clutch includes a driven flange 2 with a clutch disk 4 threadably attached thereto as well as a secondary part 3 which is rotatably carried on the driving flange 2 by means of ball bearings 17. Secondary part 3 serves as a housing for the formation of a working space 7 and a storage space 6 for a pre-determined amount of clutch fluid. The housing for the spaces 6 and 7 are formed by secondary part 3 and a cover 5 threadably connected thereto. Cover 5 is provided with a reception opening 8 forming the working space 7 and which has a thickness which conforms to the clutch disk 4 so that the clutch disk 4 is freely rotatable in the space 7.

The working space 7 is separated from the reservoir space 6 by means of an intermediate wall 10 which is part of the cover 5. The intermediate wall 10, which is here provided with an installed thin wall part 11, is on the one hand provided with an inlet opening 16 for the clutch fluid supply from storage space 6 to working space 7, and on the other hand is provided with two return bores 12 which open into the storage space 6 and cross over respectively into radially extending channels 14. The inlet opening 16 is closed and opened by means of a closing lever 15 which is pivotally moved with respect to connecting position 24 in dependance on the temperature by means of an actuating rod 23 and a bi-metal strip 23, which lever 15 thereby frees up the communication from the storage space 6 to the working space 7, more or less.

Figure 2:
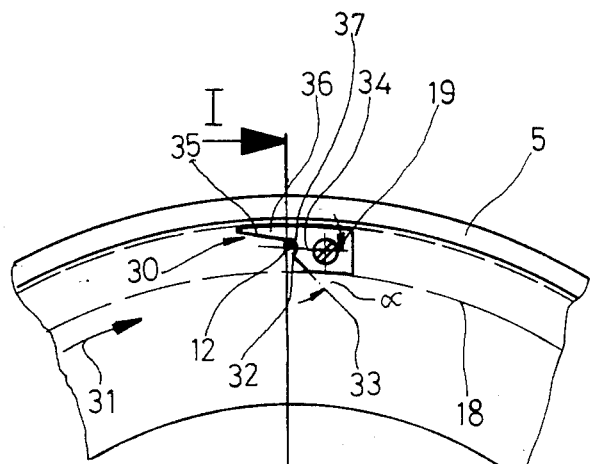
FIG. 2 is the enlarged partial view of the fluid friction clutch of FIG. 1, taken in the direction of the section line II of FIG. 1.

The clutch disk 4 is provided with a circumferentially surrounding radially outwardly open groove 18, into which groove respective damming bodies 19 extend adjacent each of the respective return bores 12. The form of one of the damming bodies 19 is illustrated in FIG. 2. These damming bodies 19 are displaced approximately 180° with respect to one another but are respectively similarly arranged in a circumferential direction. The damming bodies 19 are provided with a generally depicted guide surface 30 facing respectively against the rotational direction 31 of the clutch disk 4. Guide surface 30 exhibits in reality three-part sections disposed respectively in the region radially outwardly of the return bore 12, in the region radially inside of bore 12, and in a region which is disposed approximately at the same radius of the intermediate wall as the return bore 12.

Radially inside of the return bore 12, the guide surface 30 consists of a flat surface 32 which (FIG. 2) extends along a line 33 forming an angle α with respect to tangent 34 at the return bore of about 40°. This guide surface region 32 crosses over to a guide surface region 35 at a position radially outwardly of the return bore 12, which surface 35 consists of an approximately tangentially disposed inner surface of a protrusion 36, which protrusion 36 extends oppositely to the rotational direction 31 above the return bore 12. The two sections 35 and 32 of the guide surface 30 cross over into one another with recess portion 37 which extends in the rotational direction 31 behind the extension of the part guide surface 32 through the line 33 and around the return bore 12. The recess 37 concentrically surrounds the return bore 12 and extends then into the inside contour inner surface 35 of the protrusion 36. The damming bodies 19 themselves, as also can be seen in FIGS. 1 and 2, are preferably manufactured out of small metal or plastic plates with a right angle basic section and are fastened with the cover 5 or the intermediate wall 10 of the cover 5 by a threaded connection.

Figure 3:
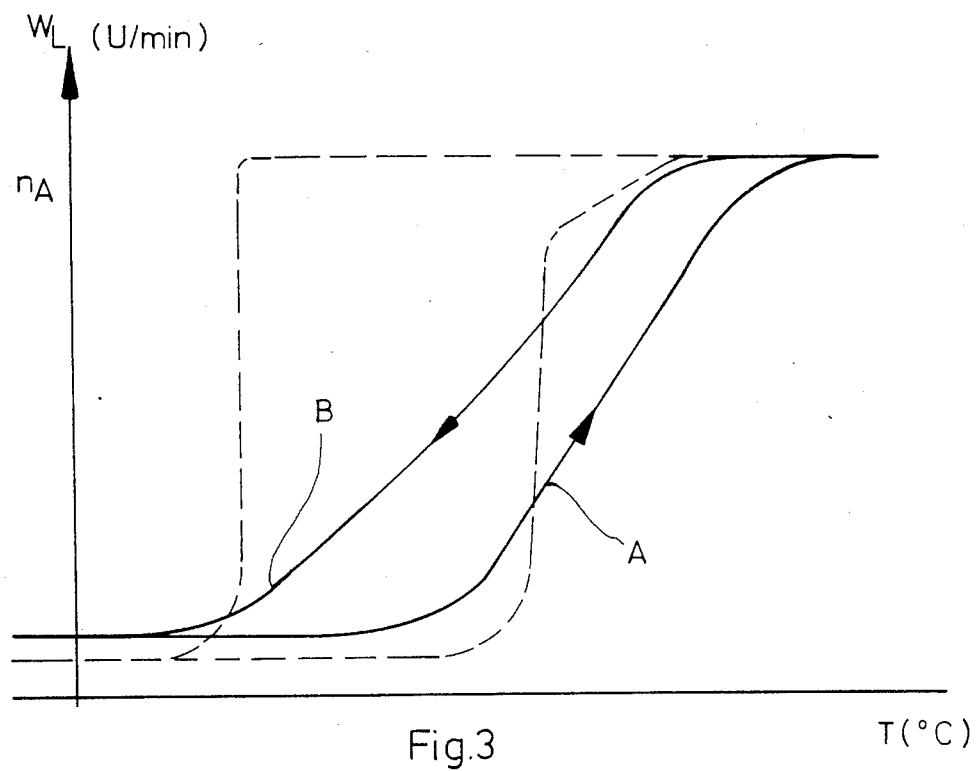
FIG. 3 is a graphical depiction of the fan velocity/cooling medium temperature characteristics for a fan driven by the fluid friction clutch of the invention as compared to a prior art arrangement.

The two diametrically oppositely disposed damming bodies 19 function in their special configuration in a clutch for driving a cooling fan, especially in harmonization with the viscosity of the oil used as the clutch fluid, with a resultant fan velocity versus temperature control characteristic as depicted in solid lines in FIG. 3. In FIG. 3 the fan rotation speed (vertical axis) is plotted against the cooling medium temperature (horizontal axis) and the upper somewhat horizontally extending branch of the characteristic curve corresponds to the condition in which the fan is rotated with the clutch disk driving rotational speed $n_A$.

The lower horizontally extending part of the characteristic curve of FIG. 3 corresponds to the empty running fan rotational speed which remains unchanged up to a certain temperature of the cooling medium, which then through the inflow of the clutch fluid from the storage space 6 into the working space 7 increases as illustrated on the branch A of the characteristic curve. The fan rotational speed increases somewhat linearly until it reaches the full fan rotational speed $n_A$. When the cooling medium temperature is lowered, the clutch is correspondingly quickly responsive and the branch B of the characteristic curve extends downwardly in somewhat the similar slope as for the climbing branch A with a flat hysteresis characteristic until the empty running rotational speed is achieved.

In comparison to the solid line characteristic of the clutch of the present invention, a known clutch according to the prior art has its characteristic velocity/temperature curve as depicted in dashed lines. One can recognize that with the prior art clutch the fan is quickly (vertical line) fully engaged to rotational speed $n_A$ responsive to a certain increase in cooling medium temperature. Furthermore, the clutch remains fully engaged until a certain lowering of the temperature. The inventive arrangement exhibits a contrast thereto with the advantage of a flat histerisis and a constant acceleration characteristic line which leads to an improvement in the efficiency characteristics of the motor clutch and fan combination.

While I have shown and described a single embodiment in accordance with the present invention, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:

1. A fluid friction clutch comprising: primary part means having a driving disk; secondary part means defining a housing;

bearing means rotatably supporting said primary and secondary means for relative rotation;

intermediate wall means separating said housing into a working space and a clutch fluid storage space, said driving disk being disposed in said working space;

at least one return bore means in said intermediate wall means for accommodating return of clutch fluid from the working space to the storage space; and damming body means disposed adjacent each of the return bore means for guiding return flow of clutch fluid to said return bore means, said damming body means exhibiting a fluid guide surface facing the rotational direction of the driving disk, said fluid guide surface including a first portion disposed radially inwardly of the return bore means which extends diagonally radially inwardly and in the driving disk rotational direction and a second portion disposed radially outwardly of the return bore means which extends diagonally radially outwardly and opposite the driving disk rotational direction, whereby the configuration of the fluid guide surface assures an improved temperature responsive control of the rotational speed of the secondary means.

2. Clutch according to claim 1, wherein the second portion extends approximately along a line extending tangentially to the circumference of the return bore means.

3. Clutch according to claim 2, wherein two of said return bore means and associated damming body means are provided, said return bore means being disposed diametrically opposite one another.

4. Clutch according to claim 3, wherein the first portion is formed as a flat surface which extends along a connecting line connecting two points at different radii of the intermediate wall means, the point at the smaller radius being disposed circumferentially in the direction of rotation of the driving disk further away from the return bore means than is the radially outermost of the points.

5. Clutch according to claim 4, wherein the connecting line is inclined at an angle of between 35° and 55° with respect to a tangent through the return bore means, which tangent extends approximately perpendicularly to a return bore intersecting radius of the intermediate wall means.

6. Clutch according to claim 5, wherein the angle is approximately 40°.

7. Clutch according to claim 1, wherein the first portion is formed as a flat surface which extends along a connecting line connecting two points at different radii of the intermediate wall means, the point at the smaller radius being disposed circumferentially in the direction of rotation of the driving disk further away from the return bore means than is the radially outermost of the points.

8. Clutch according to claim 7, wherein the connecting line is inclined at an angle of between 35° and 55° with respect to a tangent through the return bore means, which tangent extends approximately perpendicularly to a return bore intersecting radius of the intermediate wall means.

9. Clutch according to claim 8, wherein the angle is approximately 40°.

10. Clutch according to claim 8, wherein the fluid guide surface includes a third portion interconnecting the first and second portions, said third portion including a part leading from the first portion in the rotational direction and a movable part surrounding a portion of the return bore means.

11. Clutch according to claim 7, wherein the fluid guide surface includes a third portion interconnecting the first and second portions, said third portion including a part leading from the first portion in the rotational direction and a movable part surrounding a portion of the return bore means.

12. Clutch according to claim 11, wherein two of said return bore means and associated damming body means are provided, said return bore means being disposed diametrically opposite one another.

13. Clutch according to claim 1, wherein the fluid guide surface includes a third portion interconnecting the first and second portions, said third portion including a part leading from the first portion in the rotational direction and a movable part surrounding a portion of the return bore means.

14. Clutch according to claim 13, wherein the rounded part extends somewhat concentrically to the return bore means and has an approximately half circular shaped contour opening in a direction opposite the driving disk rotational direction.

* * * * *